United States Patent [19]

Melocik et al.

[11] Patent Number: 4,496,896

[45] Date of Patent: Jan. 29, 1985

[54] VEHICLE BATTERY CHARGING APPARATUS

[75] Inventors: Grant C. Melocik, Chardon; John E. Wible, Painesville, both of Ohio

[73] Assignee: Towmotor Corporation, Mentor, Ohio

[21] Appl. No.: 484,769

[22] Filed: Apr. 14, 1983

[51] Int. Cl.³ .................... H02J 7/04; H01M 10/46
[52] U.S. Cl. .................................... 320/2; 320/21
[58] Field of Search ............................ 320/2, 21

[56] References Cited

U.S. PATENT DOCUMENTS

| | | | |
|---|---|---|---|
| 3,603,860 | 9/1971 | Johnson | 320/2 |
| 3,938,018 | 2/1976 | Dahl | 320/2 |
| 4,031,449 | 6/1977 | Trombly | 320/2 |
| 4,234,839 | 11/1980 | King et al. | 320/36 |
| 4,347,472 | 8/1982 | Lemelson | 320/2 |

FOREIGN PATENT DOCUMENTS 2434890 11/1975 Fed. Rep. of Germany.

Primary Examiner—R. J. Hickey
Attorney, Agent, or Firm—Stephen L. Noe

[57] ABSTRACT

Apparatus (10) for delivering electrical energy from a charging station (12) to a vehicle (14), for example, to charge a vehicle battery (16). The apparatus (10) includes vehicle and station bumpers (18,20) each associated with a respective wire coil (28,24), and forming respective flux path elements for the coils (28,24). Means (34) are provided for sensing the relative position of the first and second coils (24,28) and controllably delivering the electrical energy in response to the sensed position. Third and fourth coils (80,82) provide two-way communication between the station (12) and the vehicle (14), and blocking means (96) facilitates removal of the vehicle (14) from the station (12).

11 Claims, 5 Drawing Figures

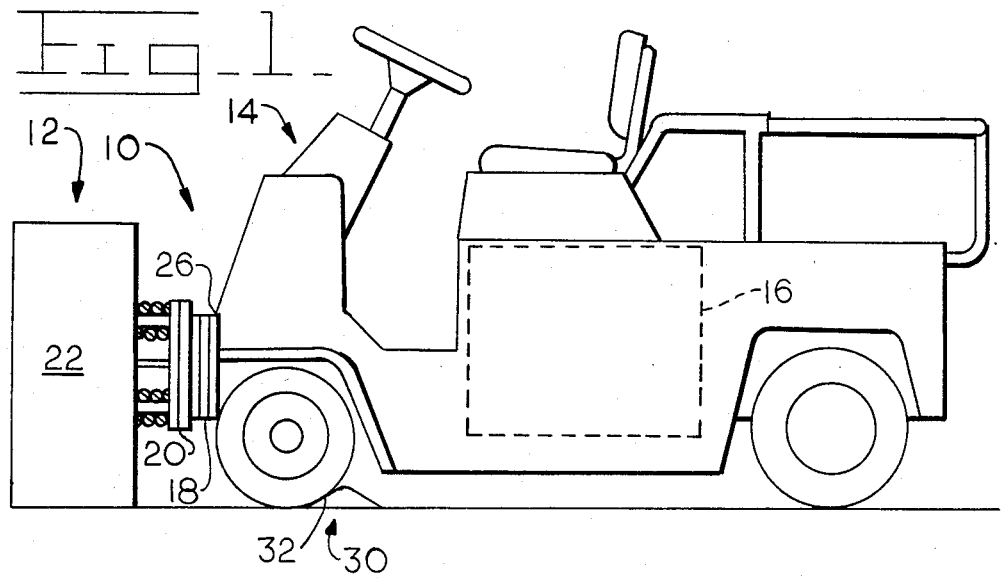
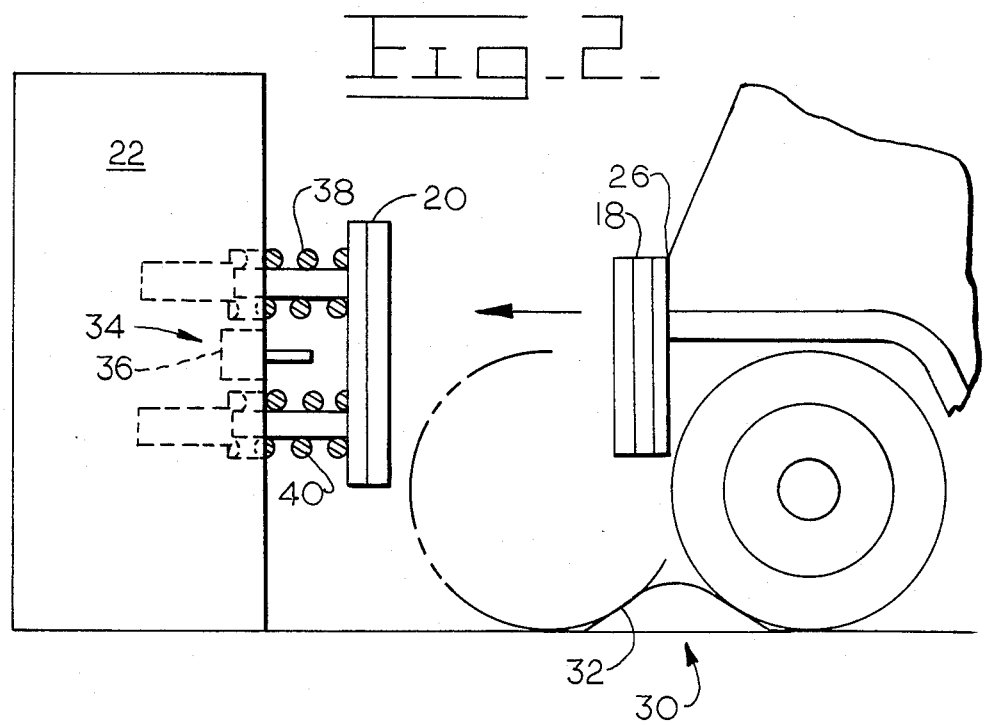

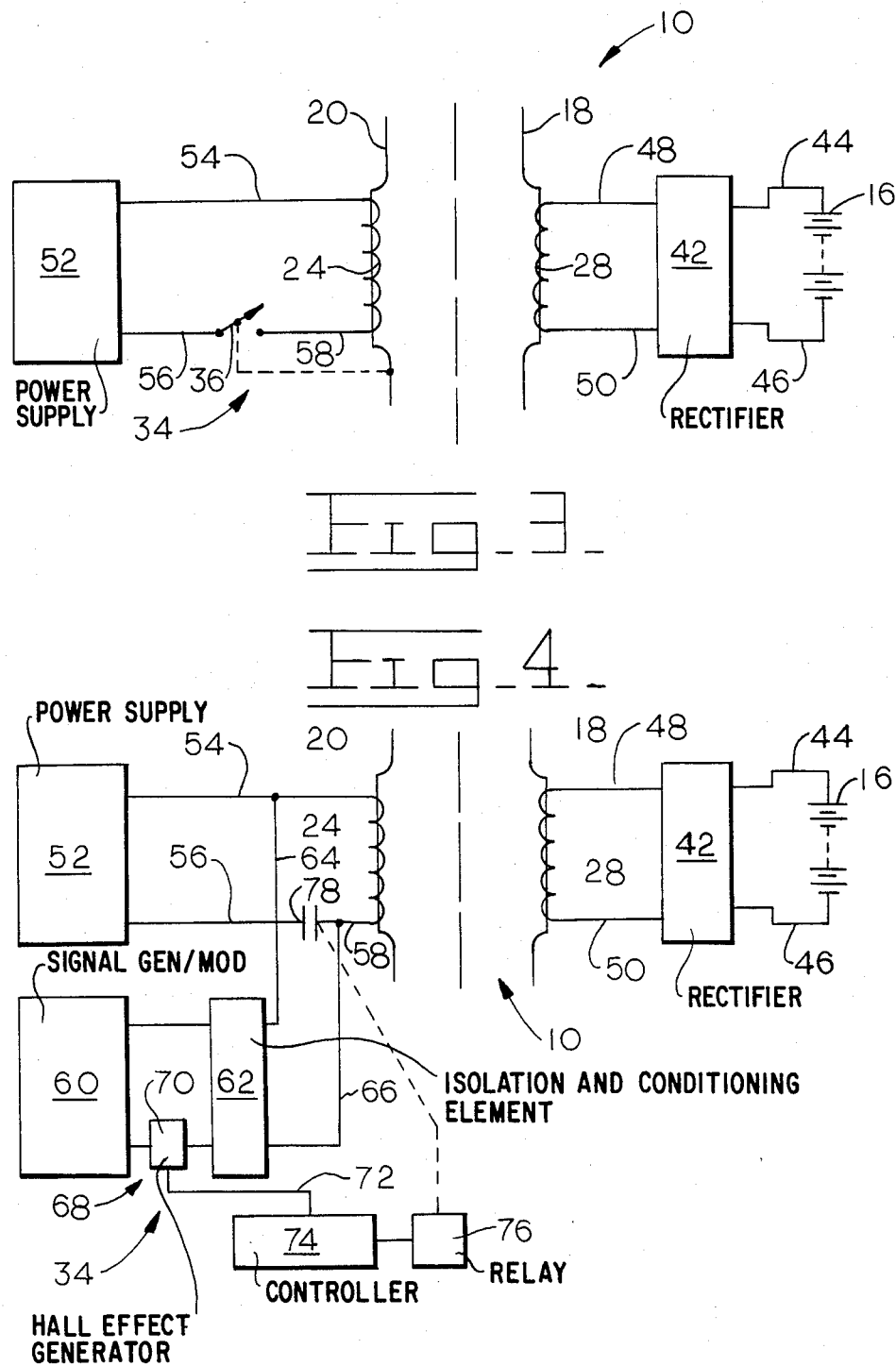

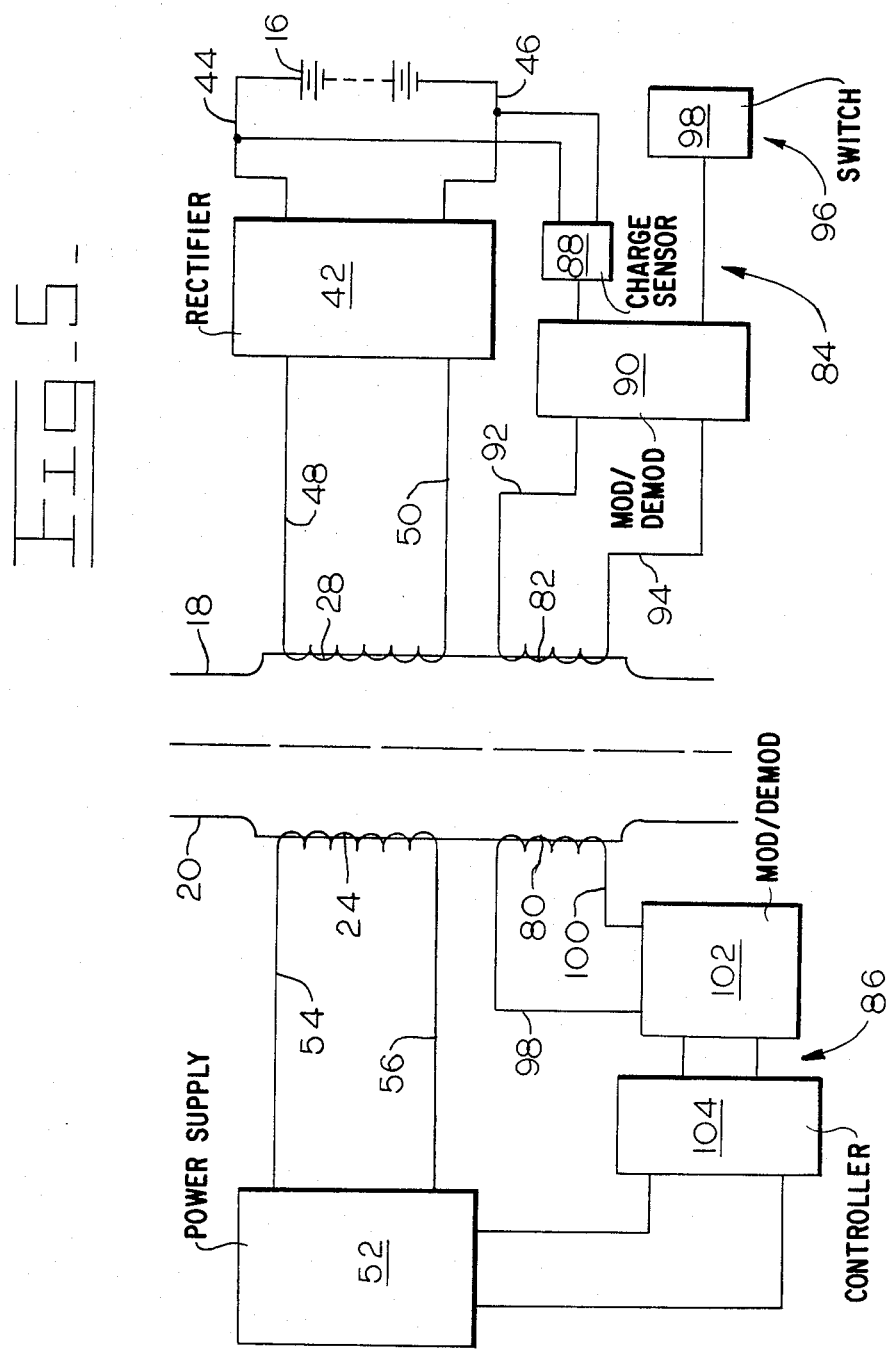

VEHICLE BATTERY CHARGING APPARATUS

DESCRIPTION

1. Technical Field

This apparatus relates generally to an apparatus for delivering electrical energy from a charging station to a vehicle and, more particularly, to an apparatus for automatically charging a vehicle battery in response to parking the vehicle at the charging station.

2. Background Art

Electric vehicles are used extensively in various applications, for example in industrial vehicles such as lift trucks, in golf carts, in other recreational vehicles, and in fleet vehicles used for short haul inner city deliveries. Personal electric vehicles are also being developed for limited range use by the general motoring public.

The practicality of such electric vehicles is partially dependent upon the ease with which the secondary batteries, normally located within the vehicles, can be recharged. A common practice is to recharge the batteries only when the vehicle is to be out of service for an extended period, for example overnight or off shift. This is because the procedure requires physically connecting the vehicle to a charging unit with wire cables. Improved battery life and performance generally results from more frequent recharging of shorter duration. However, this is generally impractical, owing to the requirement of physically connecting and disconnecting the cables.

A problem attendant to the connection and disconnection of the vehicle to the charging unit is the likelihood of distraction causing the operator of the vehicle to forget or neglect one of the procedures. Failure to connect the cable, or improper or incomplete connection, results in a vehicle unable to perform its intended task owing to a discharged battery. Failure to disconnect the cable results in damage to the cable, vehicle, charging unit, or some combination of the three.

Environmental conditions may also affect the battery charging process. Moisture and corrosive atmospheres can corrode the connecting elements of the cable, vehicle, or charging unit. This can result in a failure to charge the battery or in a reduced charging rate owing to increased contact resistance. Likewise, electrical sparking may occur during the connecting or disconnecting process, also resulting in deterioration of the contact elements and a failure to properly charge the battery.

One attempt to alleviate some of the above-identified problems is described in U.S. Pat. No. 4,347,472 issued on Aug. 31, 1982 to Jerome H. Lemelson. Lemelson describes an apparatus for charging a battery by inductively coupling a battery charger to a charging unit mounted within a vehicle.

An inductive, non-contacting charging arrangement obviates many of the above-described problems but poses some additional factors which must be considered. Proper alignment between the vehicle inductor and the charging station inductor must be accomplished and maintained for optimum inductive coupling. Charging current is advantageously applied to the charging station inductor only when required and in the amount required to minimize energy consumption. During recharging, removal of the vehicle is difficult owing to the magnetic attraction between the coupled inductors. A means for sensing an impending removal attempt can advantageously terminate the recharging process and facilitate such removal.

The present invention is directed to overcoming one or more of the problems as set forth above.

DISCLOSURE OF THE INVENTION

In one aspect of the present invention, an apparatus for delivering electrical energy from a charging station to a vehicle includes a vehicle having a battery and a vehicle bumper and a charging station having a source of electrical energy. The charging station has a ferromagnetic station bumper including a wire coil and the vehicle bumper is ferromagnetic and includes a wire coil. The bumpers form respective magnetic flux paths for the coils in response to positioning the vehicle at a predetermined location relative to the charging station. Apparatus controllably delivers electrical energy from the charging station to the vehicle.

Problems generally associated with cable type charging systems are eliminated by the inductive transfer of energy of the present invention and proper alignment of the inductive elements is advantageously facilitated. The controlled delivery of electrical energy to the vehicle is efficient and removal of the vehicle from the charging station is facilitated.

BRIEF DESCRIPTION OF THE DRAWINGS

For a better understanding of the present invention, reference may be had to the accompanying drawings, in which:

FIG. 1 is a diagrammatical representation of a vehicle at a charging station;

FIG. 2 is a partial diagrammatical representation of one aspect of an embodiment of the present invention;

FIG. 3 is a block diagram of the embodiment of FIG. 2;

FIG. 4 is a block diagram of an alternative embodiment of the present invention; and, FIG. 5 is a block diagram of a second alternative embodiment of the present invention.

BEST MODE FOR CARRYING OUT THE INVENTION

Referring to FIG. 1, an apparatus embodying certain of the principles of the present invention is generally indicated by the reference numeral (10). It should be understood that the following detailed description relates to the best presently known embodiment of the apparatus (10). However, the apparatus (10) can assume numerous other embodiments, as will become apparent to those skilled in the art, without departing from the claims.

FIG. 1 depicts an apparatus (10) for delivering electrical energy from a charging station (12) to a vehicle (14). The vehicle (14) includes a battery (16), for example a lead acid secondary storage battery, and a vehicle bumper (18). The charging station (12) includes a source of electrical energy, for example the alternating current power mains supplied by a power utility.

The charging station (12) has a ferromagnetic station bumper (20) attached at a predetermined elevation to a station surface (22). A first wire coil (24), of a gauge sufficient to safely carry a battery (16) charging current, is associated with the station bumper (20). The coil (24) is alternatively wound internal or external to the station bumper (20). The station bumper (20) forms a magnetic flux path element for the station coil (24). Winding the station coil (24) within the bumper (20) advantageously provides increased physical protection from damaging contact.

The vehicle bumper (18) is attached to a front frame surface of the vehicle (14) at a predetermined elevation, is formed of ferromagnetic material, and has associated with it a second wire coil (28). The second, or vehicle coil (28) is constructed and assembled in a manner similar to that of the first coil (24), with the vehicle bumper (18) forming a magnetic flux path for the second coil (28).

The apparatus (10) of FIG. 1 also includes means (30) for positioning the vehicle (14) at a predetermined location relative to the charging station (12). The means (30) is, for example, a ramp (32) positioned to urge the vehicle (14) into a desired abutting relationship with the charging station (12) in response to the vehicle (14) being driven onto the ramp (32). The ramp (32) includes sloping surfaces for urging and maintaining the vehicle in the abutting relationship and can include vehicle (14) wheel alignment guides to control side to side vehicle (14) position. The desired abutting relationship is, for example, one in which the station bumper (20) and the vehicle bumper (18) are positioned proximate one another with the first and second coils (24,28) being magnetically coupled by the respective ferromagnetic bumpers (20,18) in response to the vehicle (14) being positioned at the predetermined location.

The apparatus (10) further includes a means (34) for sensing the relative position of the first and second coils (24,28) and controllably delivering electrical energy from the charging station (12) to the vehicle (14) in response to the sensed position. The means (34) can advantageously assume various forms and embodiments.

In a first embodiment, as depicted in FIG. 2, the means (34) is a switch (36) associated with the station bumper (20). The station bumper (20) is resiliently mounted to the station surface (22) and is biased in a first direction apart from the station surface (22), for example by springs (38,40). The bumper (20) moves in a second direction opposite the first direction in response to positioning the vehicle (14) at the predetermined location. The relative locations of the means (30), station bumper (20), and vehicle bumper (18) are sufficient to ensure that abutment of the bumpers (18,20) results from positioning the vehicle (14) at the predetermined location and that the station bumper (20) is moved to a substantially retracted position proximate the station surface (22).

The switch (36) is, for example, a mechanical switch mounted within the charging station (12) and extending beyond the station surface (22). The switch (36) is moved in response to the movement of the station bumper (20) to the retracted position, indicating correct positioning of the vehicle (14) relative to the station (12) for inductive coupling of the vehicle and station bumpers (18,20) to occur, and controllably delivering the electrical energy to the first coil (24). The energy is inductively passed to the second coil (28), the rectifier (42), and ultimately charges the vehicle battery (16).

The embodiment of FIG. 2 is shown schematically in FIG. 3. The vehicle battery (16) is connected by wires (44,46) to the output of a charging current rectifier (42). The input of the rectifier (42) is connected across the second coil (28) by wires (48,50).

A charging current power supply (52) has a first output connected by a wire (54) to a first end of the coil (24) and a second output connected by a wire (56) to a first side of the switch (36). A second side of the switch (36) is connected to a second end of the coil (24) by a wire (58).

The switch (36) is mechanically linked to the station bumper (20). In response to the bumper (20) moving to the retracted position, the switch (36) closes and delivers charging current from the power supply (52), through the closed switch (36), to the first coil (24). The charging current is inductively coupled to the second coil (28), delivered to the rectifier (42), and to the battery (16) for charging.

The switch (36) is shown, for illustration purposes, connected in series with the first coil (24), and mechanically linked to the bumper (20). It should be realized that the switch (36) can be any element of the charging station control circuit sufficient to perform the function of controlling the delivery of electrical energy to the coil (24). The switch (36) can likewise deviate from the mechanical form shown and be implemented as, for example, a solid state switch sensing the proximity of the station bumper (20) to the station surface (22) and can be mounted in any manner suitable for such sensing.

A second embodiment of the apparatus (10) is depicted in block form in FIG. 4. In this embodiment, the means (34) is configured quite unlike the configuration discussed above. A signal generator and modulator (60) is connected, through a signal isolating and conditioning element (62), across the first coil (24).

First and second wires (64,66) are connected from the element (62) directly to respective wires (54,58). A first side of the signal generator and modulator (60) is connected directly to the element (62). A second side of the signal generator and modulator (60) is connected to a first side of transducer means (68), for example a Hall effect generator (70). A second side of the transducer means (68) is connected to the element (62). The means (68) is, therefore, in series with the signal generator (62) and the coil (24) and responds to current passing through the series circuit.

An output of the transducer means (68) is connected to a trigger controller (74) by a wire (72). The trigger controller (74) controls the energization of a relay (76), which in turn controls the open and closed state of contacts (78). The contacts (78) are shown in the same relative location as the switch (36) contacts of FIG. 3 and function in the same manner to control the delivery of electrical energy to the coil (24). In the embodiment of FIG. 4, however, the sensing of the relative position of the first and second coils (24,28), does not depend upon movement of the station bumper (20) to the retracted position, but rather on the level of a sensed signal current.

The signal generator and modulator (60) produces a signal current having a predetermined frequency which flows substantially continuously through the first coil (24). The level of signal current flowing through the coil (24) is sensed by the transducer means (68) and a signal responsive to the sensed level is delivered to the trigger controller (74). Inductive coupling between the first and second coils (24,28) causes a first level of signal current to flow through the coil (24), and freedom from inductive coupling causes a second level of signal current, different from the first level, to flow through the coil (24).

The controller (74) energizes the relay (76) in response to receiving the first sensed signal level from the transducer means (68) and deenergizes the relay (76) in response to receiving the second sensed signal level from the means (68). The contacts (78) are opened and closed in response to the energization and deenergization of the relay (76) and electrical energy is controllably delivered to the battery (16) as described with reference to the embodiment of FIG. 3.

The isolating and conditioning element (62) protects the signal current generator and modulator (60) from damage owing to high charging current levels flowing through the coil (24). The element (62) likewise provides necessary impedence matching, level shifting, and other common signal conditioning functions. The frequency of the signal current is preselected to enable the transducer means (68) to readily discriminate between the charging current and the signal current, which may be superimposed one upon the other. Well known circuits for selectively filtering electrical signals may advantageously be employed in the isolating and conditioning element (62) to further enhance the ability to discriminate between the charging current and signal current frequencies.

A third embodiment of the apparatus (10) is depicted in block form in FIG. 5. In FIG. 5 the station bumper (20) includes a third wire coil (80) and the vehicle bumper (18) includes a fourth wire coil (82). The third and fourth coils (80,82) are constructed in a manner similar to that previously described with reference to the first and second coils (24,28) with the bumpers (20,18) forming respective magnetic flux path elements for the coils (80,82). The third and fourth coils (80,82) are magnetically coupled one to the other in response to the vehicle (14) being positioned at the predetermined location. The third and fourth coils (80,82) are formed of wire of a gauge that is, for example, smaller than that used for the first and second coils (18,20) because the third and fourth coils (80,82) need carry only signal current and not charging current. The first and third coils (24,80) are advantageously electrically insulated one from the other, as are the second and fourth coils (28,82).

The vehicle (14) is provided with circuitry including means (84) for sensing the state of charge of the battery (16), producing a charging current signal in response to the sensed state of charge, and delivering the signal to the fourth coil (82). The charging station (12) includes means (86) for receiving the signal inductively coupled from the fourth coil (82) to the third coil (80) and controlling the delivery of electrical energy in response to the sensed signal.

The means (84,86) form a bidirectional inductive communication link between the charging station (12) and the vehicle (14). Because the first and third coils (24,80) and the second and fourth coils (28,82) are insulated from one another, no special isolation circuitry is required to protect the communication electronics from damage by the high charging currents.

The means (84) includes, for example, a charge sensor (88) connected across the battery (16). A signal representing the battery state of charge is delivered by the charge sensor (88) to a modulator/demodulator (90). The modulator/demodulator (90) translates the signal received from the charge sensor (88) into a first modulated frequency signal and delivers the frequency signal to the fourth coil (82) via the wires (92,94).

The means (84) also includes a means (96) for sensing a running condition of the vehicle (14) and blocking the delivery of electrical energy in response to sensing the running condition. The means (96) is, for example, a seat switch (98) that is closed in response to an operator sitting on the vehicle (14) in preparation for removing the vehicle (14) from the charging station (12). In response to sensing the running condition of the vehicle (14), for example, the presence of the seated operator, the means (96) delivers a blocking signal to the modulator/demodulator (90) which, in turn, translates the signal into a second modulated frequency signal and delivers the frequency signal to the coil (82).

The various modulated signals delivered to the fourth coil (82) are, in response to the vehicle (14) being positioned at the predetermined location, inductively coupled to the third coil (80) by the ferromagnetic bumpers (18,20). The signals coupled to the coil (80) are delivered via wires (98,100) to a second modulator/demodulator (102) which is part of the means (86).

The modulator/demodulator (102) translates the first and second modulated frequencies back to respective analog or digital signals which are, in turn, delivered to the charger controller (104). The controller (104) controls the level of charging current delivered from the charging current power supply (52) to the first coil (24) in response to the signal delivered from the charge sensor (88). Therefore, the optimum charging current level is always delivered to the battery (16) in response to the sensed state of charge of the battery (16).

In response to the blocking signal being received by the controller (104) from the means (96) the charging current is blocked from the coil (24), collapsing the primary magnetic flux field established between the bumpers (18,20), and facilitating removal of the vehicle (14) from the predetermined location by being free of magnetic attraction between the bumpers (18,20).

The charger controller (104) can also be implemented as a simple trigger controller and relay assembly, as previously discussed with regard to the embodiment of FIG. 4. Such an arrangement, however, will not provide the advantages of full control over the charging current level. Signals other than those described above can readily be delivered to the first and second modulators/demodulators (90,102), providing full two way communication between the charging station (12) and the vehicle (14).

Likewise, the embodiment of FIG. 4 can be accomplished using the third and fourth coils (80,82) as described in FIG. 5. Such alterations of the circuits and embodiments discussed will be readily apparent to those skilled in the art and can be implemented without departing from the appended claims.

INDUSTRIAL APPLICABILITY

In the operation of the apparatus (10), a vehicle (14) has an associated charging station (12). The vehicle (14) is, for example, an industrial vehicle such as a lift truck or delivery truck having a vehicle bumper (18) on at least one end of the vehicle (14). The vehicle (14) is driven by one or more electric motors and is powered by energy stored in a rechargeable battery (16). The vehicle (14) also has an associated second wire coil (28), the rectifier (42), and additional control components according to the above description of one of the embodiments of the invention.

The charging station (12) has an associated positioning means (30), station bumper (20), first wire coil (86), charging current power supply (52), and additional controlling components according to the above description of the same embodiment of the invention.

In response to a period of non-use of the vehicle (14) the operator parks the vehicle (14) at the charging station (12) by driving the vehicle (14) over the ramp (32)

with the bumpers (18,20) extending toward one another. The ramp (32) urges the vehicle (14) to the predetermined position with the bumpers (18,20) in an abutting relationship, one with the other.

The relationship of the vehicle (14) to the charging station (12), i.e., of the bumpers (18,20), is sensed by the sensing means (34) of the chosen embodiment, for example, the switch (36). In response to the vehicle (14) being in the predetermined relationship with the station (12) the charging current power supply (52) delivers electrical energy to the first coil (24). The electrical energy is inductively coupled to the second coil (28) associated with the vehicle bumper (18) and charges the battery (16) after being rectified by the rectifier (42). If the blocking means (96) is included in the chosen embodiment, the delivery of electrical energy is blocked until the running condition of the vehicle (14) is no longer sensed, for example, until the operator vacates the vehicle seat.

Maximum energy transfer from the station (12) to the vehicle (14) occurs in response to maximum inductive coupling between the first and second coils (24,28) and is assured by proper location of the bumpers (18,20) which form the flux path elements and by careful design of the positioning means (30). An indicator light can readily be included in the apparatus (10) to operate in conjunction with the power supply (52) to indicate to the operator that the vehicle (14) is properly positioned and that charging has been initiated.

In response to a need to place the vehicle (14) back in service, the operator boards the vehicle (14) and places it in the running mode. If the blocking means (96) is included in the chosen embodiment, the charging current power supply ceases to deliver electrical energy to the first coil (24) and breaks the magnetic flux path linking the station (12) and the vehicle (14). This allows the vehicle (14) to be readily driven from the station (12).

Likewise, in response to an attempt to drive the vehicle (14) from the station (12) where the station (12) includes the embodiment of FIG. 2, the initial movement of the vehicle (14) causes the station bumper (20) to move in the first direction away from the station surface (22) and from the switch (36). Continued movement in the first direction opens the switch (36), blocking delivery of electrical energy to the first coil (24) and allowing removal of the vehicle (14) as described above.

In summary, the apparatus (10) eliminates the various problems associated with cable type charging systems such as damage to the cables and connectors and failure to maintain the battery (16) charged because of the need to physically connect the cables. In addition, the apparatus (10) solves the problems associated with previous attempts at inductive battery charging such as inadequate coupling between the inductors and difficulty in removing the vehicle (14) from the charging station (12) by associating the inductor coils (24,28) with abutting station and vehicle bumpers (20,18) and by providing means for blocking the delivery of energy from the station (12) to the vehicle (14) in response to desired removal of the vehicle (14) from the station (12).

The apparatus (10) additionally enhances communication between the station (12) and the vehicle (14) by providing third and fourth coils (80,82), insulated from the first and second coils (24,28), for communication purposes, eliminating the need for elaborate isolation and protection circuitry and further ensuring reliable two-way communication.

Other aspects, objects, advantages and uses of this invention can be obtained from a study of the drawings, the disclosure and the appended claims.

We claim:

1. In an apparatus (10) for delivering electrical energy from a charging station (12) to a vehicle (14), said vehicle (14) including a battery (16) and an attached vechile bumper (18) and said charging station (12) including a source of electrical energy, the improvement comprising:

said charging station (12) having a station bumper (20), said station bumper (20) being ferromagnetic and including a first wire coil (24);

said vehicle bumper (18) being ferromagnetic and including a second wire coil (28), said station and vehicle bumpers (20,18) forming respective magnetic flux path elements for said first and second wire coils (24,28);

means (30) for positioning said vehicle (14) at a predetermined location relative to said charging station (12), said first and second coils (24,28) being magneticaly coupled by said ferromagnetic bumpers (18,20) in response to said vehicle (14) being positioned at said location; and, means (34) for sensing the relative position of said first and second coils (24,28) and controllably delivering said electrical energy from said charging station (12) to said vehicle (14) in response to the sensed position, said means (34) including means (60) for producing a signal current having a predetermined frequency and delivering said signal current to said first coil (24), said signal current flowing substantially continuously through said first coil (24).

2. An apparatus (10), as set forth in claim 1, wherein said first and second coils (24,28) are positioned within the respective station and vehicle bumpers (20,18).

3. An apparatus (10), as set forth in claim 1, wherein said station bumper (20) is resiliently mounted on said station (12) and is biased in a first direction, said bumper (20) being movable in a second direction, opposite said first direction, in response to positioning said vehicle (14) at said predetermined location.

4. An apparatus (10), as set forth in claim 3, wherein said sensing means (34) is a switch (36) associated with said station bumper (20), said switch (36) being actuated in response to the movement of said bumper (20).

5. An apparatus (10), as set forth in claim 1, wherein said sensing means (34) includes transducer means (68) for sensing the signal current flowing through said first coil (24).

6. An apparatus (10), as set forth in claim 6, wherein said transducer means (68) is a Hall effect device (70).

7. An apparatus (10), as set forth in claim 1, wherein said station bumper (20) includes a third wire coil (80) and said vehicle bumper (18) includes a fourth wire coil (82), said third and fourth coils (80,82) being magnetically coupled in response to said vehicle (14) being positioned at said predetermined location.

8. An apparatus (10), as set forth in claim 7, wherein said vehicle (14) includes means (84) for sensing the state of charge of said battery (16), producing a charging current signal in response to said sensed charge, and delivering said signal to said fourth coil (82); and said station (12) includes means (86) for sensing the signal inductively coupled from said fourth coil (82) to said third coil (80) and controlling the delivery of electrical energy in response to said sensed signal.

9. An apparatus (10), as set forth in claim 7, including means (96) for sensing a running condition of said vehicle (14) and blocking the delivery of electrical energy in response to sensing said running condition.

10. An apparatus (10), as set forth in claim 1, wherein said positioning means (30) includes at least one ramp (32) adapted to urge said vehicle (14) toward said predetermined location.

11. In an apparatus (10) for delivering electrical energy from a charging station (12) to a vehicle (14), said vehicle (14) including a battery (16) and an attached vehicle bumper (18) and said charging station (12) including a source of electrical energy, the improvement comprising:

said charging station (12) having a station bumper (20), said station bumper (20) including a first coil (24);

said vehicle bumper (18) having a second coil (28);

means (30) for positioning said vehicle (14) at a predetermined location relative to said charging station (12); and, means (34) for sensing the relative position of said first and second coils (24,28) and controllably delivering said electrical energy from said charging station (12) to said vehicle (14) in response to the sensed position, said means (34) including means (60) for producing a signal current having a predetermined frequency and delivering said signal current to said first coil (24), said signal current flowing substantially continuously through said first coil (24).

* * * * *